(12) United States Patent
Vydra et al.

(10) Patent No.: US 8,635,889 B2
(45) Date of Patent: Jan. 28, 2014

(54) REFRACTION-SENSITIVE OPTICAL FIBER, QUARTZ GLASS TUBE AS A SEMI-FINISHED PRODUCT FOR THE MANUFACTURE-THEREOF AND METHOD FOR THE MANUFACTURE OF THE FIBER

(75) Inventors: Jan Vydra, Hanau (DE); Peter Bauer, Seligenstadt (DE); Karsten Braeuer, Bruchkoebel (DE); Michael Huenermann, Alzenau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 4 days.

(21) Appl. No.: 12/737,371

(22) PCT Filed: Jul. 1, 2009

(86) PCT No.: PCT/EP2009/058247
§ 371 (c)(1),
(2), (4) Date: Jan. 6, 2011

(87) PCT Pub. No.: WO2010/003856
PCT Pub. Date: Jan. 14, 2010

(65) Prior Publication Data
US 2011/0100062 A1   May 5, 2011

(30) Foreign Application Priority Data

Jul. 7, 2008  (DE) .......................... 10 2008 031 574
Sep. 18, 2008  (DE) .......................... 10 2008 047 736

(51) Int. Cl.
*C03B 37/018*   (2006.01)

(52) U.S. Cl.
USPC .................... 65/391; 65/413; 65/415; 65/421

(58) Field of Classification Search
USPC .................................... 65/413, 415, 421, 391
See application file for complete search history.

(56) References Cited

U.S. PATENT DOCUMENTS

| 4,641,917 A | 2/1987 | Glodis et al. |
| 7,228,040 B2 | 6/2007 | Nakajima et al. |

(Continued)

FOREIGN PATENT DOCUMENTS

| EP | 1 617 243 A1 | 1/2006 |
| EP | 1 785 754 A1 | 5/2007 |

(Continued)

*Primary Examiner* — Queenie Dehghan
(74) *Attorney, Agent, or Firm* — Tiajoloff and Kelly LLP

(57) ABSTRACT

A known refraction-sensitive optical fiber comprises a core zone with an index of refraction $n_K$, a jacket zone surrounding the core zone, said jacket zone having an index of refraction $n_M$, and an annular zone made of quartz glass doped with fluorine, said annular zone surrounding the jacket zone and having an index of refraction $n_F$, where $n_F < n_M < n_K$. With this as a starting point, an optical fiber is to be provided that is characterized by high refraction-sensitivity, good spliceability and compatibility, and a method is to be provided for cost-effective manufacture of such a fiber. With regard to the method, this object is accomplished according to the invention in that the quartz glass of the annular zone (21) is produced in a plasma deposition process on the outside in which an annular zonal layer made of the quartz glass doped with fluorine is produced on a substrate body (20), said layer having a layer thickness of at least 1 mm and an index of refraction $n_F < 1.4519$ relative to the D line of the sodium vapor lamp.

14 Claims, 1 Drawing Sheet

(56) References Cited

U.S. PATENT DOCUMENTS

Figure 1:
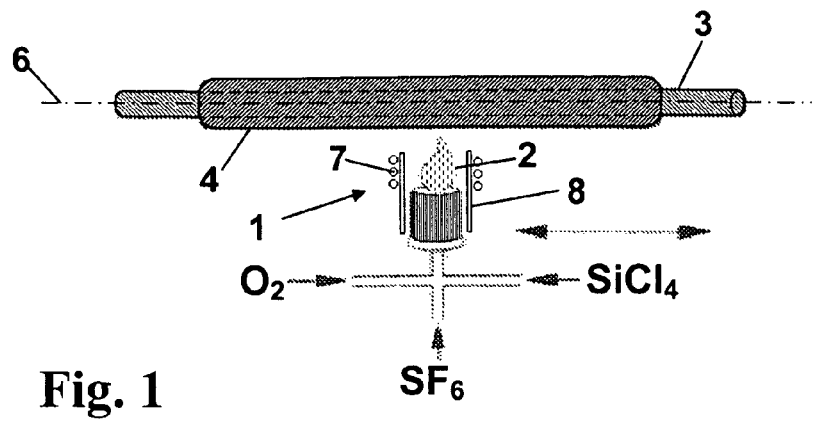

| | | |
|---|---|---|
| 7,356,234 B2 | 4/2008 | De Montmorillon et al. |
| 7,555,186 B2 | 6/2009 | Flammer et al. |
| 7,623,747 B2 | 11/2009 | De Montmorillon et al. |
| 2005/0271347 A1* | 12/2005 | Kimball et al. ............... 385/142 |
| 2006/0045448 A1 | 3/2006 | Nakajima et al. |
| 2006/0191294 A1 | 8/2006 | Ganz et al. |
| 2007/0127878 A1 | 6/2007 | De Montmorillon et al. |
| 2007/0258686 A1 | 11/2007 | De Montmorillon et al. |
| 2008/0013905 A1 | 1/2008 | Bookbinder et al. |
| 2008/0152288 A1 | 6/2008 | Flammer et al. |
| 2009/0260400 A1* | 10/2009 | Schoetz et al. ................. 65/391 |
| 2009/0263092 A1 | 10/2009 | Flammer et al. |
| 2010/0067859 A1 | 3/2010 | De Montmorillon et al. |
| 2010/0081554 A1 | 4/2010 | Huenermann |
| 2010/0260949 A1 | 10/2010 | Ganz et al. |

FOREIGN PATENT DOCUMENTS

| | | |
|---|---|---|
| EP | 1 788 415 A1 | 5/2007 |
| EP | 1 852 721 A | 11/2007 |
| EP | 1 930 753 A | 6/2008 |
| WO | WO 2004/083141 A1 | 9/2004 |
| WO | WO 2007/055881 A1 | 5/2007 |
| WO | WO 2008/071759 A | 6/2008 |

* cited by examiner

REFRACTION-SENSITIVE OPTICAL FIBER, QUARTZ GLASS TUBE AS A SEMI-FINISHED PRODUCT FOR THE MANUFACTURE-THEREOF AND METHOD FOR THE MANUFACTURE OF THE FIBER

The present invention relates to a bending-insensitive optical fiber which comprises a core zone with a refractive index $n_K$, a cladding zone cladding the core zone and having a refractive index $n_m$, and a ring zone surrounding the cladding zone and consisting of a fluorine-doped quartz glass and having a refractive index $n_F$, where $n_F<n_m<n_K$.

Furthermore, the present invention relates to a quartz glass tube as a semifinished product for producing a bending-insensitive optical fiber, and to a method for producing a bending-insensitive optical fiber which comprises a core zone with a refractive index $n_K$, a cladding zone cladding the core zone and having a refractive index $n_m$, and a ring zone surrounding the cladding zone and consisting of a fluorine-doped quartz glass and having a refractive index $n_F$, where $n_F<n_M<n_K$, by elongating a quartz glass preform or a coaxial assembly of quartz glass components.

PRIOR ART

The attenuation of the light signal guided in an optical fiber depends on bends of the fiber. Small bending radii effect an increased optical attenuation. The signal loss can be reduced by using bending-insensitive optical fibers. Such fibers have been known for many years and more and more attention is paid to them in the laying of fiber optic networks up to the home (fiber-to-the-home; FTTH). With this application, particularly small bending radii are often desired due to spatial restrictions or esthetic demands.

With bending-insensitive fibers the improvement of the bending characteristics is normally due to an increase in the refractive index difference between core and cladding owing to a "further outwardly located" cladding glass layer with small refractive index. The "further outwardly located" cladding glass layer has the advantage that it influences the mode field of the light guided in the fiber to a lesser degree than a near-core cladding glass layer, which is conducive to compatibility with standard monomode fibers.

For this purpose U.S. Pat. No. 4,641,917 A, for instance, which discloses a bending-insensitive optical fiber according to the above-mentioned type, suggests a single-mode fiber of quartz glass with a refractive index profile that comprises a core and three cladding glass zones extending coaxially around the core, of which the inner cladding glass zone adjoining the core and the outer cladding glass zone, which is also called „ring zone", are lowered in their refractive index by adding fluorine as dopant. The manufacture of this fiber is carried out by way of a standard MCVD (modified chemical vapor deposition) method. In this method the quartz glass layers doped according to the desired refractive index profile are deposited one after the other on the inner wall of a substrate tube under the action of a heating burner moved reversingly on the outside. In a modification of the MCVD method, which is known under the name FCVD (furnace chemical vapor deposition) method, the heating zone is not generated by means of a heating burner, but by means of an electric heater. The inside-coated substrate tube is collapsed into a preform and the optical fiber is drawn from the preform.

A similar concept for improving the bending properties by doping an outer ring zone with fluorine becomes also apparent from EP 1 785 754 A1, wherein the fiber is produced by using a PCVD (plasma chemical vapor deposition) method in which the quartz glass layers are deposited on the inner wall of a substrate tube under the action of an electric arc.

However, it has been found that an appropriate reduction of bending losses cannot be achieved with the known fibers. Moreover, in the inside coating methods the inner diameter of the substrate tube is a factor which limits the distance between core and ring zone and the size of the preform.

To avoid these drawbacks, so-called micro-structured optical fibers have been suggested, in which in the area of the cladding a zone is provided for the purpose of reducing the refractive index, with elongated channels extending through the zone or the zone being provided with aperiodic cavities. Such fibers are e.g.

known under the names "photonic crystal fibers" (PCF) or "hole assisted fibers" (EP 1 617 243 A1; EP 1 788 415 A1; WO 2007/055881 A1).

Although with such fiber concepts bending losses can be reduced, the manufacture of the fibers is complicated and troublesome and the fibers can only be spliced with difficulty because of the channels or cavities. Therefore, their compatibility with installed fiber networks is limited.

TECHNICAL OBJECT

The present invention refers to a concept of increasing the refractive index difference between core and cladding by fluorine-doping of a further outwardly located ring zone. The object to be achieved consists in providing an optical fiber that is distinguished by high bending insensitivity, high splicability and high compatibility, and in indicating a method for the inexpensive manufacture of such a fiber.

As for the method, this object, starting from the aforementioned method, is achieved according to the invention in that the quartz glass of the ring zone is produced in a plasma outside deposition process by producing, on a substrate body, a ring zone layer from the fluorine-doped quartz glass with a layer thickness of at least 1 mm and a refractive index $n_F \leq 1,4519$, based on the D-line of the sodium vapor lamp.

In the method according to the invention, the fluorine-doped quartz glass intended for the ring zone of the optical fiber is produced by means of a plasma outside deposition method in the form of a ring zone layer on a substrate body. The substrate body is a tube or a rod of quartz glass which is undoped or is at least partly doped.

In a plasma outside deposition method, an induction-coupled plasma burner is used and fed with start substances from which fluorine-containing $SiO_2$ particles form in a plasma zone, the particles being deposited layerwise on the substrate body rotating about its longitudinal axis and being directly sintered in this process. This method for producing quartz glass for optical fibers is generally known under the name "POD method" (plasma outside deposition). Owing to its application in the making of a bending-insensitive optical fiber, several advantages are achieved:

1. In comparison with other deposition methods, such as OVD and MCVD methods, the POD method permits the setting of particularly high fluorine contents of up to 8% by wt. in quartz glass. This is accompanied by a correspondingly distinct reduction of the refractive index of the ring zone and the possibility of forming a sufficiently great refractive-index difference with respect to the core zone and a correspondingly high bending insensitivity of the fiber. The refractive index reduction effected by fluorine doping as compared with undoped quartz glass (refractive index $n_D=1.4589$ at the wavelength of the D-line of the sodium vapor lamp) is at least 0.007

($n_F$≤1.4519), preferably at least 0.009 ($n_F$≤1.4499) and particularly preferably at least 0.016 ($n_F$≤1.4429).

2. Moreover, in the POD method there are no physical restrictions, but at the most restrictions of the technical facilities for the thickness of the ring zone layer to be deposited or of the outer diameter of the substrate body. As a consequence, the distance between the ring zone and the core zone can be set on the one hand without any problems to be so great that significant impairments of the light guidance in the fiber core are avoided—e.g. via the thickness of the substrate body. On the other hand, the thickness of the ring zone layer with a minimum thickness of 1 mm can be set such that it permits a great elongation ratio of the preform to the fiber, which has an advantageous effect on the productivity and cost efficiency of the method.

For the refractive index of undoped quartz glass the literature specifies values between $n_D$=1.4585 and 1.4589 for a measurement wavelength of 589.3 nm (D-line of the sodium vapor lamp). The present invention starts from $n_D$=1.4589.

It has been found to be useful when the ring zone layer is produced with a layer thickness of at least 1.5 mm, preferably 5 mm, and particularly preferably at least 10 mm.

As a consequence, the cost efficiency and productivity advantage of the method according to the invention, as has been described above under 2., is particularly noticed because even at a great elongation ratio an adequately great thickness of the ring zone layer is achieved in the resulting optical fiber.

Furthermore, it has turned out to be advantageous when the ring zone layer is clad with an outer layer of quartz glass having a higher viscosity than the quartz glass of the ring zone layer.

The doping with fluorine reduces the viscosity of the quartz glass, which may have a negative impact in subsequent hot-forming steps in which the ring zone layer is positioned on exposed surface. To avoid such a situation, the ring zone layer is provided in the preferred method variant with an outer layer having a higher viscosity, in the simplest case with an outer layer of undoped quartz glass or of quartz glass which is doped with fluorine in a small concentration. Alternatively, dopants may also be used that increase the viscosity of quartz glass, e.g. nitrogen or aluminum. The viscosity-enhancing effect of the dopants contributes to the thermal stability of the outer layer. Especially nitrogen can be easily incorporated into the quartz glass network in the POD process in that a nitrogen-containing gas, such as $N_2O$, is supplied to the plasma burner.

It has turned out to be particularly advantageous when the outer layer is produced by means of a plasma outside deposition process on the ring zone layer.

Both the ring zone layer and the outer layer are here produced by means of a POD process. Hence, the same facility can be used and retooling operations or the provision of otherwise needed equipment can be avoided. This simplifies production, reduces the risk of waste and makes the manufacturing process of the bending-insensitive optical fiber less expensive. Moreover, this measure is also beneficial to the quality of the interface between ring zone layer and outer layer.

In a particularly preferred design of the method according to the invention, it is intended that the ring zone layer is applied to a substrate body in the form of a rod-shaped mother core preform having a core region and at least one cladding region cladding the core region, the core region having an outer radius $r_K$ and the ring zone layer having an inner radius $r_F$, the ratio of $r_F/r_K$ being greater than 2.2, preferably greater than 2.5 and particularly preferably greater than 2.8.

The ratio $r_F/r_K$ is a measure of the distance between the core region of the mother core preform and the ring zone layer. This distance is preferably more than 2.2 times the radius of the core region. This protects the core region in the further processing of the mother core preform against impurities, particularly against hydroxyl groups, issuing from the ring zone layer, and yields productivity advantages as compared with MCVD or PCVD methods in which the ring zone layer is formed in the inner bore of a substrate tube. With the distance, however, the influence of the ring zone on the light guidance of the optical fiber is decreasing on the other hand, so that distances of more than 5.5 times the core region radius are not preferred. The mother core preform itself can be obtained from an even larger preform by elongation.

The mother core preform provided with the ring zone layer can be provided with additional cladding material and subsequently directly drawn into an optical fiber. As a rule, and preferably, the mother core preform provided with the ring zone layer has an outer diameter of at least 70 mm, preferably at least 90 mm, and is elongated into a core preform.

The total length of the resulting core preform is many times greater than that of the initial mother core preform. Only the core preform obtained in this way is lined with additional cladding material and further processed into the bending-insensitive optical fiber. The additional cladding material can e.g. be obtained, with formation of a preform, by overcladding the core preform with a cylinder of quartz glass or by outside coating with $SiO_2$ material or by the known rod-in-tube technique, with the core preform being surrounded by one or several quartz glass tubes with formation of a coaxial assembly of quartz glass components and said assembly being elongated into a preform or directly into the fiber.

Due to the relatively large outer diameter of the mother core preform of at least 70 mm and the accompanying great draw-out ratio relative to the core preform, this procedure permits a particularly economic production of the optical fiber. Apart from the standard methods for the outside coating of the core preform with $SiO_2$ material by deposition and direct vitrification of $SiO_2$ particles, coating by way of thermal spraying, particularly by way of plasma spray methods, and deposition of $SiO_2$ soot material is also possible.

In an alternative and equally suited variant of the method according to the invention, the ring zone layer is applied to a substrate body which is present in the form of a mother tube of quartz glass having an outer diameter of at least 70 mm, preferably at least 90 mm, the mother tube provided with the ring zone layer being elongated into a zone tube.

The mother tube consists of doped or undoped quartz glass. The tube itself can be obtained from an even larger hollow cylinder by way of elongation.

For the above-mentioned reasons a further layer of quartz glass of higher viscosity can be applied to the ring zone layer. The mother tube provided with the ring zone layer can e.g. be further processed as a substrate tube in a tube inside-coating method or as an overcladding tube in a rod-in-tube method. As a rule, and preferably, the mother tube provided with the ring zone layer has, however, a relatively large outer diameter of at least 70 mm, preferably at least 90 mm, and is first elongated into a zone tube.

In this instance, too, the relatively large outer diameter of the mother tube of at least 70 mm and the accompanying great draw-out ratio relative to the zone tube contribute to an economic production of the optical fiber. It has turned out to be useful when during elongation a draw-out ratio is set in the range of from 3 to 100. The greater the draw-out ratio (the ratio of the tube lengths after and before the elongating process) the smaller are the manufacturing efforts with respect to the length of the resulting zone tube. With draw-out ratios below the said lower limit, there is no significant contribution in this respect. With draw-out ratios above the said upper limit, very large-volume composite tubes that are difficult to handle have to be used.

A particularly economic production of the zone tube is achieved in a preferred variant of the method in which at least part of the quartz glass of the mother tube is produced in a soot deposition process which includes depositing $SiO_2$ particles with formation of a $SiO_2$ soot body, doping the $SiO_2$ soot body with fluorine and vitrifying the $SiO_2$ soot body, while obtaining a quartz glass with fluorine doping that effects a refractive index reduction of less than 0.007 in comparison with undoped quartz glass.

Soot deposition processes of this type are e.g. generally known under the names "OVD" or "VAD". The soot body is doped with fluorine in the depositing process and/or in a separate doping step and/or during vitrification of the soot body. The achievable fluorine doping reduces the refractive index to a certain degree as compared with undoped quartz glass—though this reduction is lower than the reduction of the refractive index in the ring zone produced by POD. The fluorine-doped quartz glass of the zone tube, however, also makes a contribution to the bending insensitivity of the optical fiber. When the soot body is vitrified, the mother tube is obtained, or a semifinished product from which the mother tube is made by way of elongation.

The zone tube obtained by elongation is further processed. In this connection a zone tube has turned out to be useful that comprises a fluorine-doped interlayer and has an outer diameter of at least 25 mm, preferably at least 30 mm.

The ring zone layer of the mother tube that is produced by way of a POD method is present in the zone tube in the form of an interlayer enclosed between two outer layers of higher viscosity. This simplifies the handling of the zone tube in subsequent further processing steps.

In has been found that in hot processing steps in which the zone tube is exposed to high temperatures a high fluorine content may lead to the formation of bubbles. The sandwich form of the zone tube with the ring zone layer enclosed therein therefore serves not only the thermal stabilization of the zone tube, but also prevents the formation of bubbles in that it acts as a barrier layer against the out-diffusion of fluorine out of the ring zone layer. Moreover, the outer layers that are not doped with fluorine or doped with fluorine to a small degree can provide improved interfaces with respect to an adjoining quartz glass layer.

During elongation of the mother tube the inner bore of the resulting zone tube is formed without any tools, so that an inner surface that has been smoothed by hot forming and exhibits a particularly high surface quality is obtained. The zone tube can e.g. be used as a cladding tube for producing PCF fibers or as a semifinished product for other manufacturing methods for preforms and optical fibers.

Preferably, the zone tube is used in an MCVD or PCVD or FCVD method as the substrate tube.

In these processes the zone tube is provided with an inner coating. The inside-coated zone tube is subsequently collapsed onto a so-called core rod. This rod is distinguished in that it contains a ring zone layer of fluorine-doped quartz glass. Due to the manufacturing process, the ring zone layer can be remote from the core region to a relatively large extent and has a particularly high fluorine doping and thus a low refractive index, which is beneficial to the qualification of the core rod for the manufacture of bending-insensitive optical fibers.

Alternatively, and equally preferably, the zone tube is used in a rod-in-tube process as an overcladding tube for overcladding a core rod and is elongated into a preform or an optical fiber, the core rod comprising a core region and at least one cladding region cladding the core region, the core region has an outer radius $r_K$, and the ring zone layer has an inner radius $r_F$, the ratio of $r_F/r_K$ being greater than 2.2, preferably greater than 2.5 and particularly preferably greater than 2.8.

The ratio $r_F/r_K$ serves here as a measure of the distance between the core region of the core rod and the ring zone layer of the zone tube, with the annular gap between the core rod and the zone tube, which is in the range of around 1 mm, being negligible. This distance is preferably more than 2.2 times the core region radius, which protects the core region during drawing into a preform or into the optical fiber, particularly against hydroxyl groups from the ring zone layer; this yields productivity advantages in comparison with the MCVD or PCVD method in which the ring zone layer is generated in the inner bore of a substrate tube. Since the influence of the ring zone on the light guidance of the optical fiber is decreasing with the distance, the distance should not be more than 5.5 times the core region radius.

As for the quartz glass tube as a semifinished product for a bending-insensitive optical fiber, the aforementioned object is achieved according to the invention in that it comprises an inner layer of quartz glass, a ring zone layer surrounding the inner layer and consisting of fluorine-doped quartz glass, and an outer layer surrounding the ring zone layer, the quartz glass of the ring zone layer having a refractive index $n_F<1.4519$, based on the D-line of the sodium vapor lamp, in comparison with undoped quartz glass and a mean hydroxyl group content of less than 5 wt. ppm.

The quartz glass tube can be produced by means of the above-described method of the invention and corresponds to a "zone tube", as has already been described further above. It comprises a ring zone layer which is distinguished on the one hand by a comparatively high mean fluorine content and on the other hand by a comparatively low mean hydroxyl group content.

The refractive-index reduction effected by fluorine doping in comparison with undoped quartz glass is at least 0.007, preferably at least 0.009 and particularly preferably at least 0.016 in comparison with the refractive index $n_D=1.4589$ of undoped quartz glass (at the wavelength of the D-line of the sodium vapor lamp).

Due to the low hydroxyl group content the quartz glass tube can also be used for near-core regions of an optical fiber if the working wavelength thereof is influenced by the presence of hydroxyl groups. Such a quartz glass can be produced by means of a plasma deposition process using hydrogen-free or hydrogen-poor plasma. The quartz glass of inner layer and outer layer, which contains no fluorine or contains less fluorine than the quartz glass of the ring zone layer, can be produced by means of a plasma deposition process.

The inner bore of the quartz glass tube according to the invention comprises an inner wall formed in the melt flow without tools. The smooth and high-quality surface of the inner bore is e.g. obtained in that the quartz glass tube is produced by elongating a more thick-walled start tube (mother tube).

As for an optical attenuation of the fiber that is as small as possible in the range of the hydroxyl group absorption, the quartz glass of the inner layer has a mean hydroxyl group content of less than 0.5 wt. ppm.

The setting of such a low hydroxyl group content requires great efforts. As a rule, however, higher hydroxyl group contents can be accepted for the outer layer.

Therefore, one embodiment of the quartz glass tube of the invention is preferred for reasons of costs, in the case of which the quartz glass of the outer layer has a mean hydroxyl group content in the range of from 1 to 50 wt. ppm.

It has also turned out to be useful when the quartz glass of the outer layer is doped with a substance enhancing the viscosity of quartz glass.

The fluorine doping of the ring zone layer reduces the viscosity of the quartz glass, which may have a negative effect in subsequent hot working steps in which the ring zone layer is positioned on exposed surface. To avoid such a situation, the outer layer is given a higher viscosity in that the quartz glass contains dopants that increase the viscosity, as e.g. nitrogen or aluminum.

Preferably, the ring zone layer has a layer thickness of less than 3 mm.

The comparatively expensive, fluorine-doped quartz glass of the ring zone layer is here only configured with a small layer thickness of less than 3 mm, so that the corresponding quartz glass tube can be produced at relatively low costs. However, after elongation into an optical fiber, a ring zone layer having a very small layer thickness of less than 200 µm only shows a small effect in relation to a decrease in the bending sensitivity of the fiber.

The quartz glass tube according to the invention is e.g. suited as a substrate tube for use in an MCVD or PCVD method for producing preforms for optical fibers and as a cladding tube in the preform manufacture according to the so-called rod-in-tube technique.

As for the bending-insensitive optical fiber, the above-mentioned object, starting from an optical fiber with the features of the above-mentioned type, is achieved according to the invention in that the quartz glass of the ring zone has a refractive index $n_F \leq 1.4519$, based on the D-line of the sodium vapor lamp, in comparison with undoped quartz glass, and the ratio $r_F/r_K$ is greater than 2.2.

The bending-insensitive optical fiber according to invention can be produced with the help of the method explained in detail above in that the quartz glass of the ring zone is produced by means of a plasma outside deposition method. The fiber is distinguished by a combination of properties that have so far not been achievable, namely:

1. A particularly high fluorine content of up to about 8% by wt. This is accompanied by a correspondingly distinct reduction of the refractive index of the ring zone in comparison with undoped quartz glass of at least 0.007, preferably at least 0.009 and particularly preferably at least 0.016 in comparison with the refractive index $n_D=1.4589$ of undoped quartz glass (at the wavelength of the D-line of the sodium vapor lamp), and the possibility of forming an adequately great refractive-index difference with respect to the core zone and a correspondingly high bending insensitivity of the fiber.
2. A great distance between the ring zone and the core zone is distinguished by the ratio $r_F/r_K$. This ratio is greater than 2.2, preferably greater than 2.5 and particularly preferably greater than 2.8 in the optical fiber according to the invention. This great distance avoids significant impairments of the core zone by impurities, particularly by hydroxyl groups from the ring zone layer during the manufacturing process of the fiber, and this yields productivity advantages in comparison with MCVD or PCVD methods where the ring zone layer is produced in the inner bore of a substrate tube. Since the influence of the ring zone is on the other hand decreasing with an increasing distance from the core zone, distances of more than 5.5 times the core zone radius are not preferred.

EMBODIMENT

Figure 2:
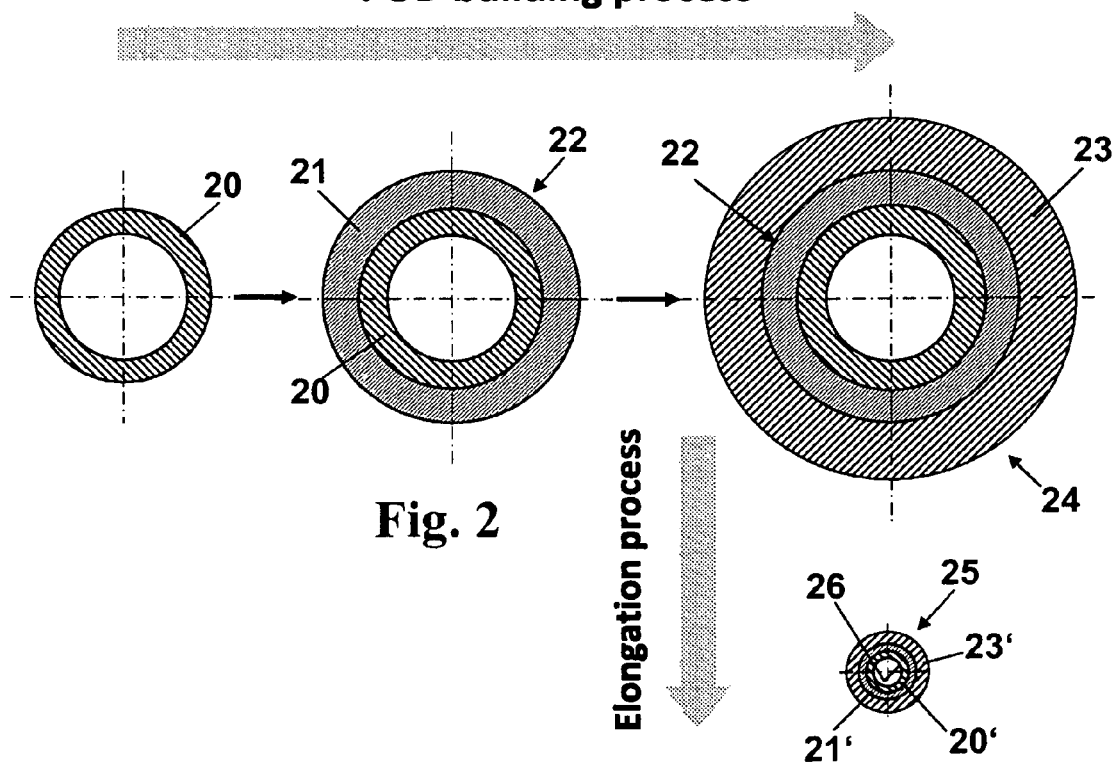

The invention will now be explained in more detail with reference to embodiments and a patent drawing. The drawing is a schematic illustration showing in detail in:

FIG. 1 a device for performing the POD method for depositing fluorine-doped quartz glass; and FIG. 2 an illustration for creating an embodiment of the quartz glass tube according to the invention with individual method steps and intermediate products.

EXAMPLE 1

FIG. 1 schematically shows an apparatus for performing a method for depositing fluorine-doped quartz glass on a carrier tube 3. The carrier tube 3 consists of undoped quartz glass and has an inner diameter of 80 mm and an outer diameter of 90 mm.

A ring zone layer 4 of fluorine-doped quartz glass is produced on the carrier tube 3 by means of a standard POD method. To this end $SiCl_4$, oxygen and $SF_6$ are supplied to a plasma burner 1 and converted in a plasma zone 2 assigned to the plasma burner 1 into $SiO_2$ particles. The plasma zone 2 is produced within a reaction sleeve 8 of quartz glass that is surrounded by a high-frequency coil 7.

Owing to the measure that the plasma burner 1 is reversingly moved from one end to the other end along the carrier tube 3 rotating about its longitudinal axis 6, the $SiO_2$ particles are layerwise deposited on the outer cylindrical surface thereof. The rotational speed of the carrier tube 3 and the translational speed of the plasma burner 1 are set such that the individual quartz glass layers have a mean thickness of about 12 µm. A ring zone layer 4 of fluorine-doped quartz glass is thereby produced with a thickness of 5 mm and is homogeneously fluorine-doped, resulting in a refractive index reduction in comparison with undoped quartz glass of 0.017 ($n_F=1,4428$).

Immediately thereafter, an outer layer of undoped quartz glass is produced with a thickness of 5 mm on the fluorine-doped quartz glass layer in a further POD deposition process. The $SF_6$ gas stream is here switched off.

The resulting sandwich tube of inner layer of undoped quartz glass, fluorine-containing ring zone layer and outer layer of undoped quartz glass (also called "mother tube") has an outer diameter of 110 mm and is elongated in a ratio draw with a draw-out ratio of 11.1 without tools into a thin-walled zone tube having an outer diameter of 33 mm and a wall thickness of 4.5 mm. The wall of the zone tube is composed of an outer layer of undoped quartz glass having a thickness of 1.5 mm, a ring zone layer of homogeneously fluorine-doped quartz glass with a thickness of 1.5 mm and an inner layer of undoped quartz glass with a thickness of 1.5 mm, and it is distinguished by an inner wall smoothed by hot forming, which shows a particularly high surface quality.

The mean hydroxyl group content of the inner layer is 0.4 wt. ppm, that of the ring zone layer is 4 wt. ppm, and that of the outer layer is about 5 wt. ppm.

The resulting zone tube is used as a cladding tube for overcladding a core rod in a rod-in-tube method. To this end, pieces are cut off with the desired lengths from the zone tube. The core rod has a $GeO_2$-doped core region with a radius $r_K$ of 4.25 mm and is surrounded with an inner cladding of undoped quartz glass having a layer thickness of 6.25 mm.

The core rod is inserted into the inner bore of the zone tube and said tube, in turn, is enveloped with a jacket tube of undoped quartz glass. This coaxial arrangement of components is then introduced in vertical orientation into a drawing furnace and is softened therein zonewise, starting with the lower end, and a fiber is drawn off from the softened region. The outer layer and the inner layer of the zone tube serve as "passivation layer" to prevent the out-diffusion of fluorine from the ring zone layer and thus the formation of bubbles. Moreover, these layers contribute to a low-defect contact area and interface with respect to the inner cladding of the core rod and with respect to the jacket tube.

A bending-insensitive optical single-mode fiber having an outer diameter of 125 μm is thereby drawn, said fiber being distinguished by a ring zone with a high fluorine concentration and having a distance from the outer region of the core zone that is distinguished by a ratio $r_F/r_K$ of 2.86, where $r_F$ designates the inner radius of the ring zone in the fiber and $r_K$ the outer radius of the core zone of the fiber.

EXAMPLE 2

FIG. 2 schematically shows an inner tube 20 of a fluorine-doped quartz glass that is commercially available under the name F320-08 of Heraeus Quarzglas GmbH & Co. KG. The quartz glass is produced by means of a $SiO_2$ soot deposition process (OVD method) and has a hydroxyl group content of 0.1 wt. ppm and a fluorine content that effects a refractive index reduction of 0.001 in comparison with undoped quartz glass (n=1.4579).

The inner tube 20 has an inner diameter of 20 mm and a wall thickness of 7 mm. A ring zone layer 21 with a layer thickness of 10 mm is formed on the inner tube 20 by means of POD deposition and said layer is homogeneously doped with fluorine so that a refractive index reduction is obtained in comparison with undoped quartz glass of 0.010 ($n_F$=1.4489).

The composite structure 22 consisting of inner tube 20 and ring zone layer 21 of fluorine-doped quartz glass is subsequently provided in a further POD process and in the same way as described above with an outer layer 23 of undoped quartz glass having a layer thickness of 15 mm. The total wall thickness of the zone tube 23 produced in this way is thus 32 mm.

The zone tube 23 is drawn in an elongation process with a draw-out ratio of 25.21 without tools into a thin-walled zone tube 25 having an outer diameter of 25 mm and a wall thickness of 3 mm. The wall of the zone tube 25 is composed of an outer layer 23' of undoped quartz glass with a thickness of 1.77 mm and a ring zone layer 21' with a thickness of 0.85 m and an inner layer 20' with a thickness of 0.38 mm of differently fluorine-doped quartz glass and with an overall thickness of 3 mm, and it is distinguished by an inner wall 26 smoothed by hot forming and having a particularly high surface quality.

The mean hydroxyl group content of the inner layer is 0.05 wt. ppm, that of the ring zone layer is 4 wt. ppm, and that of the outer layer is about 5 wt. ppm.

The zone tube obtained in this way is used as a substrate tube for producing a preform for optical fibers. With this application the outer layer and the inner layer of the zone tube serve as "stabilization layers" for mechanically stiffening the fluorine-containing ring zone layer 20; 21. Moreover, the outer layers contribute to a low-defect contact area and interface with respect to the adjoining layers.

In the MCVD method a cladding glass layer of undoped quartz glass is first deposited with the help of standard process techniques on the inner wall of a zone tube piece that has been cut to length in that oxygen and $SiCl_4$ are introduced into the inner bore of the zone tube, $SiO_2$ particles are formed in a reaction zone and said particles are vitrified on the inner wall directly into the cladding glass layer. On the inside of the cladding glass layer a core glass layer is produced in that $GeCl_4$ is additionally fed to the inner bore, resulting in an increase in the refractive index by $5 \times 10^{-3}$ in comparison with the undoped quartz glass of the cladding glass layer.

Subsequently, the substrate tube coated on the inside is collapsed, resulting in a core rod having an outer diameter of 20 mm, which comprises a core region having an outer radius of $r_K$ of 2.5 mm, which is surrounded by two layers of undoped quartz glass having a layer thickness of 4 mm on the whole. The adjoining ring zone layer has an inner radius of $r_F$ of 6.5 mm. This yields a value of 2.6 for the ratio $r_F/r_K$.

The core rod is overclad with a jacket tube of undoped quartz glass and a bending-insensitive optical single-mode fiber with an outer diameter of 135 μm is drawn from the preform produced in this way, the fiber being distinguished by a ring zone having a high fluorine concentration and a great distance from the core zone that is distinguished by the ratio $r_F/r_K$ of 2.6, wherein $r_F$ designates the inner radius of the inner zone in the fiber and $r_K$ the outer radius of the core zone.

EXAMPLE 3

A core rod with a core region of $GeO_2$-doped quartz glass and a cladding region of undoped quartz glass with an outer diameter of 90 mm and a d/a ratio of 4.5 (d=outer diameter of the cladding region; a =core region diameter) is provided.

A ring zone layer of fluorine-doped quartz glass with a thickness of 5 mm is produced on the cladding surface of the core rod by means of a standard POD method, as is described in more detail with reference to Example 1. The ring zone layer is homogeneously doped with fluorine, so that a refractive-index reduction of 0.017 is obtained in comparison with the undoped quartz glass of the cladding region ($n_F$=1,4428).

Immediately thereafter, an outer layer of undoped quartz glass with a thickness of 5 mm is produced on the fluorine-doped quartz glass layer in a further POD process. The $SF_6$ gas stream is here switched off.

The resulting mother preform consisting of core rod, fluorine-containing ring zone layer and outer layer of undoped quartz glass has an outer diameter of 110 mm and is elongated in a ratio draw with a draw-out ratio of 3.36 without any tools into a core preform with an outer diameter of 60 mm.

The core preform is thus composed of a core having an outer diameter of 11 mm, an inner cladding with a wall thickness of 19 mm, a ring zone of fluorine-doped quartz glass and an outer layer of undoped quartz glass, each having a wall thickness of 2.75 mm.

The mean hydroxyl group content of the ring zone layer is 4 wt. ppm and that of the outer layer is about 5 wt. ppm.

The core preform is provided in a rod-in-tube method with further cladding material in the form of undoped quartz glass and is simultaneously drawn off into an optical fiber, as has already been described further above.

A bending-insensitive optical single-mode fiber having an outer diameter of 125 μm is thereby obtained, the fiber being distinguished by a ring zone with a high fluorine concentration and having a distance from the outer region of the core zone that is distinguished by a ratio $r_F/r_K$ of 4.5, wherein $r_F$ designates the inner radius of the ring zone in the fiber, and $r_K$ the outer radius of the core zone of the fiber.

The invention claimed is:
1. A method for producing a bending-insensitive optical fiber, said method comprising:

providing a quartz glass preform or a coaxial assembly of quartz glass components; and elongating said quartz glass preform or said coaxial assembly of quartz glass components so as to produce the optical fiber comprising a core zone of quartz glass with a refractive index $n_K$, a cladding zone of quartz glass cladding the core zone and having a refractive index $n_M$, and a ring zone surrounding the cladding zone, said ring zone being of a fluorine-doped quartz glass and having a refractive index $n_F$, where $n_F < n_M < n_K$, said providing including providing a substrate body in the form of a mother tube of quartz glass having an outer diameter of at least 70 mm, including forming at least part of the quartz glass of the mother tube using a soot deposition process that includes depositing $SiO_2$ particles so as to form a $SiO_2$ soot body, and producing the quartz glass of the ring zone in a plasma outside deposition process by producing, on the substrate body, a ring zone layer of the fluorine-doped quartz glass with a layer thickness of at least 1 mm and the refractive index $n_F$ being less than or equal to 1.4429, based on the D-line of a sodium vapor lamp, wherein the quartz glass of the mother tube has a refractive index equal to the refractive index $n_M$ and less than the refractive index $n_F$ of the quart glass of the ring zone laver; and wherein the ring zone layer is applied to the mother tube and the ring zone layer is elongated with the mother tube into a zone tube.

2. The method according to claim 1, wherein the ring zone layer is produced with a layer thickness of at least 1.5 mm.

3. The method according to claim 1 wherein the ring zone layer is clad with an outer layer of quartz glass having a higher viscosity than the quartz glass of the ring zone layer.

4. The method according to claim 3, wherein the outer layer of quartz glass is produced by a plasma outside deposition process on the ring zone layer.

5. The method according to claim 1, wherein the mother tube comprises quartz glass that is produced with fluorine doping that effects a reduction in comparison with undoped quartz glass of the refractive index of the quartz glass of the mother tube, said reduction being less than 0.007.

6. The method according to claim 1, wherein the zone tube comprises a fluorine-doped inner annular layer derived at least partly from the ring zone layer and has an outer diameter of at least 25 mm.

7. The method according to claim 1, wherein the zone tube is used in an MCVD or PCVD or FCTD method as a substrate tube and is provided with an inner coating.

8. The method according to claim 1, wherein the zone tube is used in a rod-in-tube process as an overcladding tube for a core rod and is elongated into a preform or an optical fiber, the core rod comprising a core region and at least one cladding region cladding the core region and the core region having an outer radius $r_K$, and the ring zone layer has an inner radius $r_F$, the ratio of $r_{F/r_K}$ is greater than 2.2.

9. The method according to claim 1, wherein the ring zone layer is produced with a layer thickness of at least 5 mm 10. The method according to claim 1, wherein the ring zone layer is produced with a layer thickness of at least 10 mm.

11. The method according to claim 1, wherein the ring zone layer is applied to the substrate body that is present in the form of a mother tube of quartz glass that has an outer diameter of at least 90 mm, wherein the mother tube with the ring zone layer is elongated into a zone tube.

12. The method according to claim 1, wherein the zone tube has a fluorine-doped inner annular layer derived at least partly from the ring zone layer, and has an outer diameter of at least 30 mm.

13. The method according to claim 1, wherein the zone tube is used in a rod-in-tube process as an overcladding tube for a core rod and is elongated into a preform or an optical fiber, the core rod has a core region and at least one cladding region cladding the core region and the core region has an outer radius $r_K$, and the ring zone layer has an inner radius $r_F$, wherein the ratio of $r_F/r_K$ is greater than 2.5.

14. The method according to claim 1, wherein the zone tube is used in a rod-in-tube process as an overcladding tube for a core rod and is elongated into a preform or an optical fiber, the core rod has a core region and at least one cladding region cladding the core region and the core region has an outer radius $r_K$, and the ring zone layer has an inner radius $r_F$, wherein the ratio of $r_F/r_K$ is greater than 2.8.

* * * * *

UNITED STATES PATENT AND TRADEMARK OFFICE
CERTIFICATE OF CORRECTION

PATENT NO. : 8,635,889 B2
APPLICATION NO. : 12/737371
DATED : January 28, 2014
INVENTOR(S) : Vydra et al.

Page 1 of 1

It is certified that error appears in the above-identified patent and that said Letters Patent is hereby corrected as shown below:

In the Claims

In claim 1, line 27 (Column 11, line 25), "less" should be changed to --greater--;

In claim 1, line 28 (Column 11, line 26), "quart" should be changed to --quartz--; and In claim 1, line 29 (Column 11, line 27), "laver" should be changed to --layer--.

Signed and Sealed this
Fifth Day of August, 2014

Michelle K. Lee
*Deputy Director of the United States Patent and Trademark Office*